Nov. 2, 1937.　　　W. T. POWELL　　　2,097,800
INTERLOCKING SYSTEM FOR RAILROADS
Filed Nov. 24, 1934　　　2 Sheets-Sheet 1
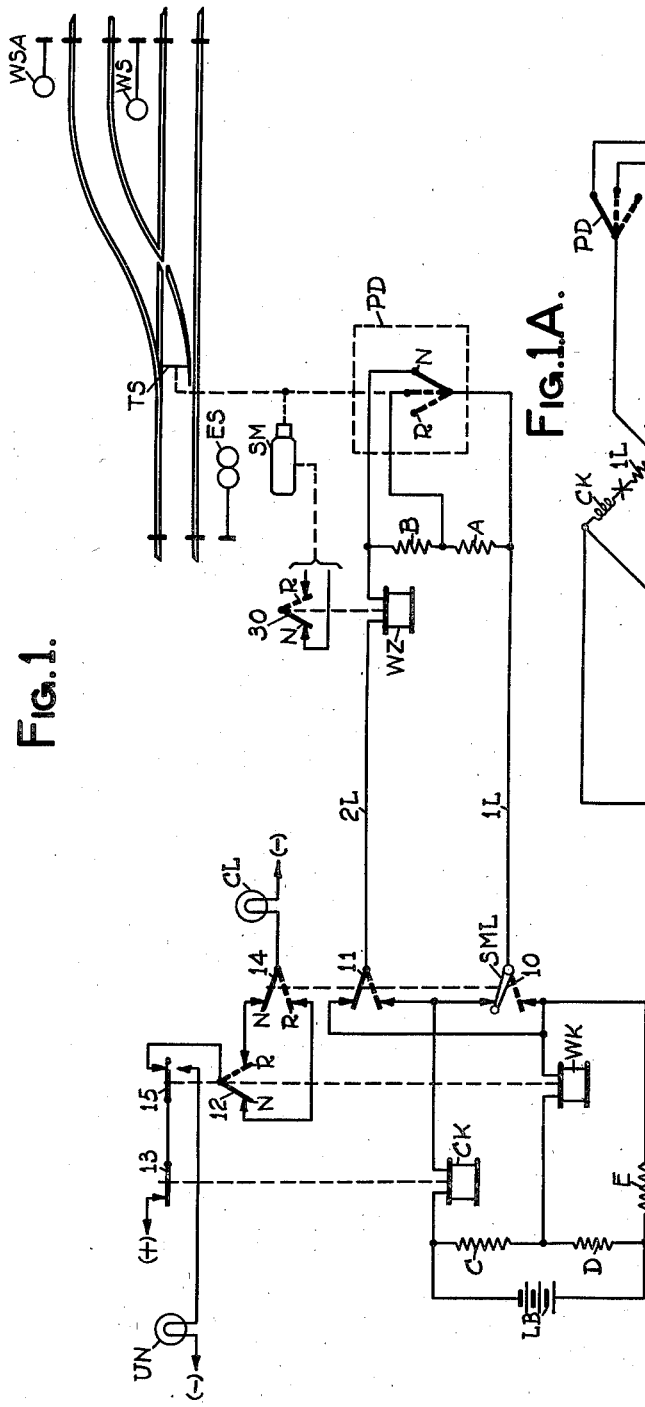
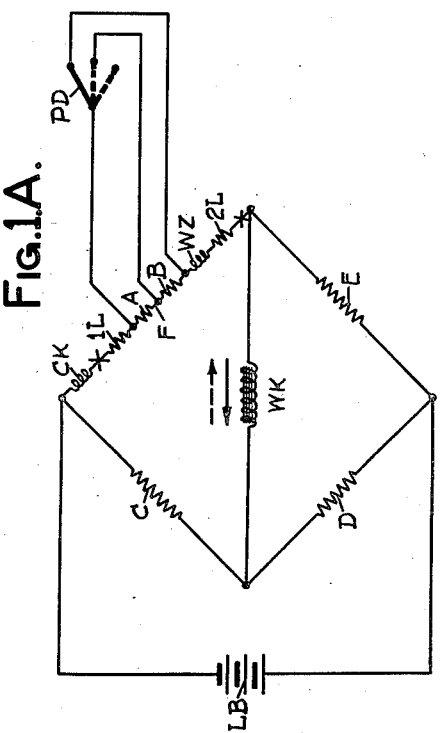
INVENTOR
W. T. Powell,
BY Neil D. Preston,
his ATTORNEY

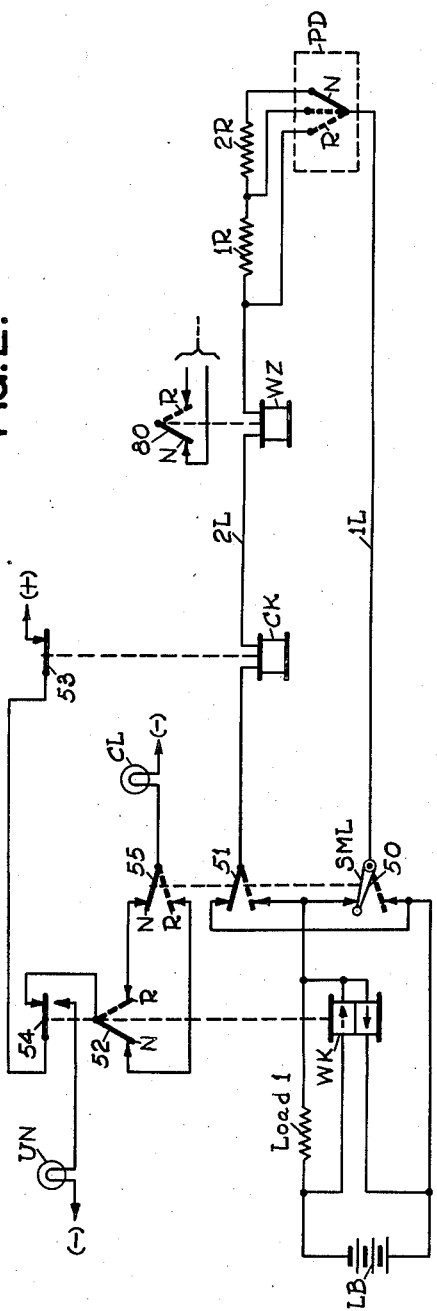
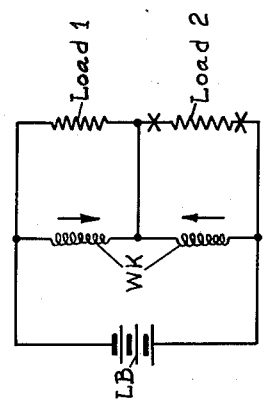

Patented Nov. 2, 1937

2,097,800

UNITED STATES PATENT OFFICE 2,097,800

INTERLOCKING SYSTEM FOR RAILROADS

Winfred T. Powell, Rochester, N. Y., assignor to General Railway Signal Company, Rochester, N. Y.

Application November 24, 1934, Serial No. 754,620

20 Claims. (Cl. 246—3)

This invention relates to interlocking systems for railroads and it more particularly pertains to a system for transmitting controls from a control office to an outlying field station over a single circuit and for transmitting indications representing the conditions of certain apparatus over the same line circuit from the field station to the control office.

In one type of electric interlocking systems for railroads to which the present invention more particularly relates, the switches, signals or other traffice controlling devices are operated from a remote point such as a tower or the like.

Similarly, information regarding the positions and conditions of the various traffic governing devices is transmitted from the remote point, where these devices are located, to the tower in the form of indications for giving the operator this information in a readily discernible form.

In accordance with the present invention it is proposed to control a switch machine at a field station to its normal and reverse positions by transmitting current of normal and reverse polarity over a two wire line circuit connecting the switch machine lever in the office to the switch machine controlling relay at the station. An important feature of the present invention is to so arrange the circuits that the same two wire line circuit is used (irrespective of the polarity of energization of the line circuit) to transmit indications back to the control office in accordance with the position of the switch machine for operating a switch machine indicating relay, which in turn controls a visual indication device for informing the operator the condition of the distant switch machine device.

Various other objects, purposes and characteristic features of the present invention will be in part obvious from the accompanying drawings and in part pointed out as the description progresses.

Two forms of circuit arrangement employing the present invention will be described and the novel features will be pointed out in the claims.

The accompanying drawings are diagrammatic views illustrating the two forms selected as typical examples for practicing the present invention.

*Apparatus.*—Fig. 1 illustrates one form of the present invention in which currents of reverse polarity are used for controlling the switch machine control relay over the two wire line circuit and in which an over-balanced, an under-balanced and a balanced Wheatstone bridge circuit arrangement is used for transmitting indications back to the control office. Fig. 1 shows the wiring of the detailed circuits for accomplishing this control. Fig. 1A is the circuit of Fig. 1 drawn in schematic form in order to more conveniently describe the Wheatstone bridge operation in connection with the transmission of indications.

Fig. 2 is a modified form of the invention with the circuits showing the transmission of normal and reverse currents for operating the switch machine control relay illustrated somewhat in detail. Fig. 2A shows the line circuit of Fig. 2 drawn up in schematic form in order to more conveniently describe the operation of this embodiment of the invention. It will be understood that contact 80 of relay WZ of Fig. 2 controls the switch machine for operating the track switch in the same manner as indicated by contact 30 in Fig. 1. Furthermore, the point detector contacts PD of Fig. 2 are operated by the switch machine and its associated track switch, all in the same manner indicated in Fig. 1. The principle involved in the circuit of Fig. 2 (more clearly illustrated in Fig. 2A) is the use of a first load and a second load connected across the two windings of a differential relay, this relay being de-energized when both loads are equal and energized in one sense when a first load becomes greater than a second load and in another sense when the second load becomes greater than the first load.

Referring to Fig. 1, the reference character TS designates a railway switch which is operated by a switch machine SM. This machine may be, for example, of the type shown in the patent to W. K. Howe, No. 1,466,903, dated September 4, 1923.

The switch machine is controlled by a manually operated switch machine lever SML which may, for example, be one of a group of similar levers in an interlocking machine. As here shown, lever SML may be moved into a normal position N in which it is illustrated in the drawings or into a reverse position R indicated by the dotted lines. Lever SML controls the operation of the switch machine to its normal or its reverse position through the medium of a switch machine control relay WZ, which relay is operated to its normal or its reverse position by current of normal or reverse polarity from battery LB.

The switch machine, through its point detector contact PD, controls the operation of a switch repeating relay WK. This relay when de-energized repeats the unlocked condition of the switch machine by lighting lamp UN. When this relay is energized with its polar contact to the left it repeats the condition of the switch machine in its normal locked position and when the relay is energized with its polar contact to the right it repeats the condition of the switch machine in its reverse locked position. Correspondence lamp CL is so connected in the switch machine lever and switch machine repeating relay circuits that it is energized when the lever and relay are out of correspondence but is de-energized when the relay is operated to repeat the condition that the switch machine is in correspondence with the switch machine lever.

Checking relay CK is so connected in the line circuit that it remains energized as long as the continuity of the line circuit is maintained complete. In the event of a break or open circuit in the line, relay CK becomes de-energized so that when no control can be exercised over the line, the operator is given an indication that the circuit is not functioning properly. It will be obvious that another lamp may be provided for operation through a back contact of relay CK, which lamp would light to give an indication of a trouble condition in connection with the line circuit. The above discussion applies to both Fig. 1 and Fig. 2, since these two circuits are provided with the apparatus described.

In both embodiments it is assumed that east bound traffic over track switch TS is controlled by signal ES and west bound traffic over this track switch is controlled by signals WS and WSA, but since this portion of the system forms no part of the present invention the details of the signal control have been omitted.

In the Fig. 1 modification resistance units C, D and E are connected in the three arms of a Wheatstone bridge as illustrated in Fig. 1A. Resistance units A and B, together with checking relay CK and switch machine control relay WZ are connected in the fourth arm of the Wheatstone bridge.

In Fig. 2, a load resistance referred to as load 1 is connected across the upper winding of relay WK. Load 2 comprises the CK and WZ relays, the resistance of the two line conductors and two resistance units IR and 2R located at the field station. The points marked X in Fig. 2A indicate the positions of the switch machine lever contacts which reverse the connection of load 2, including the line circuit leading to the battery circuit.

The points marked X in Fig. 1A indicate where the switch machine lever reverses the connections to the two line conductors. The resistances marked IL and 2L in Fig. 1A represent the resistance of line 1 and the resistance of line 2 respectively.

*Operation.*—Referring to Figs. 1 and 1A, relay WZ is energized over a circuit extending from the (+) terminal of battery LB, winding of relay CK, contact 10 of lever SML in its full line position, line conductor IL, point detector contact PD in its normal position, winding of relay WZ, line 2L, contact 11 of lever SML in its full line position, and resistance unit E to the (−) terminal of battery LB. It will be noted that resistance units A and B at the substation are short circuited by the point detector contact in its normal position. A circuit may also be traced from the (+) terminal of battery LB through resistance units C and D in series, to the (−) terminal of the battery.

The current in the above described circuit actuates polar contact 30 of relay WZ to its normal position, in which position it controls the switch machine for actuating the track switch to its normal position. This control has been indicated by a dotted line connection between these contacts and the switch machine, since the detailed circuit arrangement is immaterial for an understanding of the loal control of the switch machine by the switch machine control relay.

Polar relay WK is connected to points in the circuit more clearly indicated in Fig. 1A. With the point detector contact in the position illustrated, resistance units A and B are short circuited which lowers the resistance of this arm of the bridge to a substantial degree as compared with the resistance of this arm when the point detector contact is in either of its other positions. The circuit is so arranged that when the point detector contact is in its neutral position resistance A is short circuited but resistance B remains in the circuit. The circuit constants are such that under this condition the bridge is balanced so that the product of the resistances of arms F and D equals the product of the resistances of arms C and E. Under this condition the points to which the terminals of relay WK are connected are at equal potential so that no current flows through the winding of this relay.

Under the condition above assumed (PD in the position illustrated) the resistance value of arm F is so reduced that the bridge may be said to be underbalanced. That is, since arm F is of comparatively low resistance, current flows from the (+) terminal of battery LB through this arm and through the winding of relay WK in the direction of the full line arrow and through resistance D to the (−) terminal of the battery. This operates the polar contact 12 of relay WK to its left hand (normal) position to indicate that the switch machine is in its normal position.

Relay CK is energized in the above described circuit to maintain its front contact 13 closed, but since relay WK has its polar contact 12 in correspondence with contact 14 of lever SML, no circuit is completed to energize lamp CL.

It will now be assumed that it is desired to reverse switch TS. To accomplish this, lever SML is moved from its normal to its reverse position, thereby energizing relay WZ in the opposite direction over a circuit extending from the (+) terminal of battery LB, winding of relay CK, contact 11 of lever SML in its dotted line position, line conductor 2L, winding of relay WZ, point detector contact PD in its normal position, line conductor IL, contact 10 of lever SML in its dotted line position and resistance unit E to the (−) terminal of battery LB. The current flowing in this circuit reverses the position of contact 30 of relay WZ for causing the switch machine to operate to its reverse position. This reversal of the current in the line circuit reverses the energization of relay CK, causing this relay to be momentarily de-energized, but since it is immediately picked up, its release serves no purpose.

Before the point detector contact leaves its normal position relay WK remains in its previously described position and a circuit is closed for lighting lamp CL which extends from (+) front contact 13 of relay CK, front contact 15 of relay WK, contact 12 of relay WK in its normal position, contact 14 of relay SML in its reverse position and lamp CL, to (−).

As soon as the point detector contact reaches its neutral position, resistance B is included in the circuit of arm F of the bridge but resistance A remains short circuited. This is the balanced condition of the bridge and relay WK is deenergized. A circuit is now closed for lighting lamp UN which extends from (+), front contact 13 of relay CK, back contact 15 of relay WK, and lamp UN, to (—). The lighting of lamp UN gives the unlocked indication.

As soon as the switch reaches its reverse locked condition, both resistance units A and B are included in the circuit of arm F of the bridge to establish the overbalanced condition. Under this condition the resistance of arm F is considerably raised so that the path of least resistance for current to flow from battery LB extends from the (+) terminal of this battery, resistance unit C, winding of relay WK in the direction of the dotted line arrow of Fig. 1A and resistance unit E to the (—) terminal of the battery. This energizes relay WK in the opposite sense for actuating its contact 12 to its reverse dotted line position. The picking up of contact 15 of relay WK de-energizes lamp UN as an indication that the switch is in its locked position and since contacts 12 and 14 are in correspondence in their reverse dotted line positions, no circuit is effective to light lamp CL and this is an indication to the operator that the switch machine is in correspondence with the switch machine lever.

It will be noted that relay CK is energized under all of the above conditions except during the transition period, when contacts 10 and 11 of the switch machine lever are moving from one position to the other. By making these contacts of the snap action type, relay CK is thus not de-energized for sufficient time to allow its contact 13 to drop away, except for the momentary interval above mentioned. In the event that the line circuit becomes open, then relay CK is de-energized and the continued open circuit at contact 13 of this relay prevents the energization of either lamp UN or CL which indicates to the operator that a trouble condition exists.

If it is desired to restore switch TS to its normal position, lever SML is restored to its full line position as shown in the drawings. The transfer of contacts 10 and 11 restore the circuit to the line as indicated in the drawings and relay WZ actuates its contact 30 to the left for moving the switch machine to its normal position. When the unlocked condition is indicated by the point detector contact in its neutral position, relay WK is de-energized as before and when the point detector contact reaches its normal position resistance units A and B are short circuited for establishing the underbalanced condition, which permits current to flow through relay WK in the direction of the full line arrow for positioning its polar contact 12 to the left. With contacts 12 and 14 in their full line positions no circuit is completed for lamp CL, which lamp remains dark as an indication to the operator that the switch machine is in correspondence with the control lever. With the point detector contacts out of correspondence with the lever contacts, relay WK completes the circuit for lighting lamp CL which indicates to the operator the proper functioning of the apparatus.

Referring to Figs. 2 and 2A, with the apparatus in the condition indicated the constants of the circuit are so proportioned that the resistance of load 2 (including the line wires and resistance units IR and 2R) is higher than the resistance of load 1. Under this condition the potential drop across the lower winding of relay WK is greater than the potential drop across its upper winding. This causes more current to flow through the lower winding in the direction of the full line arrow of Fig. 2 which effects the positioning of its polar contact to the left.

With the point detector contact in its neutral position, the circuit constants are so selected that the resistance of load 2 is equal to the resistance of load 1. Under this condition the potential drop across the two windings of relay WK is equal. With the resistance and turn values of relay WK approximately equal, the relay is de-energized under this condition because of the differential connection of its windings, as shown in Fig. 2A. Since this relay is of the magnetic stick type its polar contact remains in its last actuated position while its neutral contact is dropped.

With the point detector contact in its reverse position, resistances IR and 2R are excluded from the circuit which lowers the resistance of load 2 in comparison with the resistance of load 1. Then the potential drop across the lower winding of relay WK is less than the potential drop across its upper winding. Under this condition more current flows through the upper winding in the direction of the dotted line arrow of Fig. 2 so that the polar contact is positioned to the right.

With the apparatus in the condition illustrated in Fig. 2, a circuit is closed for actuating relay WZ to the left which extends from the (+) terminal of battery LB, load 1 and the upper winding of relay WK in multiple, contact 50 of lever SML in its full line position, line conductor 1L, point detector contact PD in its normal position, resistances 2R and IR, winding of relay WZ, line conductor 2L, winding of relay CK and contact 51 of lever SML in its full line position, to the (—) terminal of battery LB. Under this condition the resistance of load 2 is higher than load 1 so that the potential drop across the lower winding of relay WK is greater than the potential drop across its upper winding. This positions contact 52 of relay WK to the left as previously described.

As shown in Fig. 2 and more clearly illustrated in Fig. 2A, both windings of relay WK are energized over a circuit extending from the (+) terminal of battery LB through these two windings in series, to the (—) terminal of battery LB. Since these two windings are differentially connected the current flow in this circuit is ineffective to energize the relay when the loads are equal.

With relay WK in its normal position in correspondence with lever SML, no circuit is effective to light lamp CL but when lever SML is actuated to its reverse position a circuit is immediately effective to light this lamp extending from (+), front contact 53 of relay CK, front contact 54 of relay WK, contact 52 of relay WK in its normal position, contact 55 of lever SML in its reverse position and lamp CL, to (—).

When the point detector contact reaches its neutral position as an indication that the switch machine is unlocked, the resistance of load 1 is then made equal to the resistance of load 2 by removing resistance unit 2R. As above described this de-energizes relay WK for completing an unlocked switch indication circuit extending from (+), front contact 53 of relay CK, back contact 54 of relay WK and lamp UN to (—).

When the switch machine reaches its reverse locked position both resistance units IR and 2R are removed from the circuit including load 2, which renders load 2 lower in resistance than load 1. Then the potential drop across the lower winding of relay WK is less than the potential drop across its upper winding resulting in energizing the upper winding of this relay to a greater degree than its lower winding, which actuates contact 52 to its dotted line reverse position. With contacts 52 and 55 in correspondence the circuit to lamp CL is incomplete and this lamp is de-energized to indicate such condition to the operator.

When lever SML is actuated to its reverse dotted line position the circuit for energizing relay WZ is reversed so that this relay is now energized over a circuit extending from the (+) terminal of battery LB, load l and upper winding of relay WK in multiple, contact 51 in its reverse dotted line position, winding of relay CK, conductor 2L, winding of relay WZ, resistance units IR and 2R, point detector contact PD in its normal position, line conductor lL and contact 50 of lever SML in its reverse dotted line position to the (—) terminal of battery LB. Current flowing in this circuit is effective to actuate contact 80 of relay WZ to its reverse dotted line position.

It will be thus observed that relay WK is actuated in response to the variation in load conditions irrespective of the polarity of energization of the line circuit. Therefore the line is energized with normal and reverse polarities for controlling the switch machine control relay and this line is conditioned to increase, decrease or balance the load (including the line) with a fixed load for transmitting indications, with current flowing over the line in either a normal or reverse direction.

As in Fig. 1, the relay CK of Fig. 2 is de-energized if the line circuit becomes open for indicating such a condition to the operator by the failure of lamps UN and CL to momentarily light in response to the actuation of the switch machine lever. Relay CK is momentarily released by current reversals in the line but, as in Fig. 1, this has no effect on the indication circuit except to momentarily delay the time during which the indication lamp is energized.

Although I have herein shown and described only two forms of railway track controlling and indicating apparatus embodying my invention, it is to be understood that various changes and modifications may be made therein within the scope of the appended claims without departing from the spirit or scope of my invention.

Having thus described my invention, what I claim is:—

1. In a remote control system, a control office, a field station, a line circuit connecting said office with said station and normally energized with current of normal degree, a control lever in said office for changing the polarity of energization of said line circuit, a control relay at said station distinctively responsive to the polarity of energization of said line circuit, a contactor at said station controlled by said control relay for changing the degree of energization of said line circuit, an indication relay and an indicating device in said office, means responsive to said normal and said change in degree of energization of said line circuit for distinctively operating said indication relay, a checking relay in said office positioned in response to the energization of said line circuit, means responsive to a de-energized condition of said line circuit for changing the position of said checking relay, means responsive to a distinctive operation of said indication relay for energizing said indicating device, and means responsive to said change in position of said checking relay for preventing the energization of said indicating device.

2. In a remote control system, a control office having a source of energy, a field station, a line circuit connecting said office with said station and normally energized from said source, a resistance unit in said office connected to receive energy from said source, a control lever in said office for changing the polarity of energization of said line circuit, a control relay at said station distinctively responsive to the polarity of energization of said line circuit, a contactor at said station controlled by said control relay for increasing, decreasing, or equalizing the resistance of said line circuit with respect to said resistance unit, an indication relay and an indicating device in said office, circuit means for so connecting said indication relay to said source, said resistance unit and said line circuit as to cause said indication relay to be distinctively operated in response to the increasing or decreasing of the resistance of said line circuit, a checking relay in said office positioned in response to the energization of said line circuit, means responsive to a de-energized condition of said line circuit for changing the position of said checking relay, means controlled by said indication relay for energizing said indicating device, and means responsive to said change in position of said checking relay for preventing the energization of said indicating device.

3. In combination; a railway track switch controlling a point detector contact having normal, reverse and unlocked positions; a manually operable lever having normal and reverse positions; a control relay having normal and reverse positions; a circuit including said lever, said control relay and said point detector contact; means controlled by said lever for characteristically energizing said circuit whereby said control relay is operated to normal and reverse positions for actuating said switch to corresponding positions; means responsive to the operation of said point detector contact to its different positions for varying the degree of energization of said circuit for each different position; and means responsive to the variations in degree of energization of said circuit for distinctively registering the different positions of said point detector contact.

4. In combination; a railway track switch controlling a point detector contact having normal and reverse positions; a lever having normal and reverse positions; a Wheatstone bridge circuit having a variable arm including said lever and a resistance unit; an indication relay included in the detector arm of said Wheatstone bridge circuit; means responsive to the operation of said lever to its normal and reverse positions for actuating said switch to corresponding positions; means controlled by said point detector contact in its normal position for in effect excluding said resistance unit from said variable arm; means controlled by said point detector contact in its reverse position for effectively including said resistance unit in said variable arm; and means responsive to said exclusion and inclusion of the resistance unit in said variable arm for characteristically operating said indication relay to register two distinctive positions of said point detector contact.

5. In combination; a railway track switch controlling a point detector contact having normal, reverse and unlocked positions; a lever having normal and reverse positions; a Wheatstone bridge circuit having a variable arm including said lever and a resistance unit; an indication relay included in the detector arm of said Wheatstone bridge circuit; means responsive to the operation of said lever to its normal and reverse positions for actuating said switch to corresponding positions; means controlled by said point detector contact in its normal position for excluding said resistance unit from said variable arm; means controlled by said point detector contact in its reverse position for including said resistance unit in said variable arm; means controlled by said point detector contact in its unlocked position for including only a portion of said resistance unit in said arm; and means responsive to said exclusion and inclusion of the resistance unit in said variable arm for characteristically operating said indication relay to register three distinctive positions of said point detector contact.

6. In combination; a railway track switch controlling a point detector contact having normal, reverse and unlocked positions; a lever having normal and reverse positions; a Wheatstone bridge circuit having a variable arm including said lever and a resistance unit; an indication relay included in the detector arm of said Wheatstone bridge circuit; means responsive to the operation of said lever to its normal and reverse positions for actuating said switch to corresponding positions; means controlled by said point detector contact in its normal position for excluding said resistance unit from said variable arm; means controlled by said point detector contact in its reverse position for including said resistance unit in said variable arm; means controlled by said point detector contact in its unlocked position for including only a portion of said resistance unit in said variable arm; means responsive to said exclusion and inclusion of the resistance unit in said variable arm for characteristically operating said indication relay to register three distinctive positions of said point detector contact; means including said lever and said indication relay for indicating the lack of correspondence between said switch and said lever; and means including said indication relay for indicating the unlocked condition of said switch.

7. In combination; a railway track switch controlling a point detector contact having normal, reverse and unlocked positions; a lever having normal and reverse positions; a Wheatstone bridge circuit having a variable arm including said lever and a resistance unit; an indication relay included in the detector arm of said Wheatstone bridge circuit; means responsive to the operation of said lever to its normal and reverse positions for actuating said switch to corresponding positions; means controlled by said point detector contact in its normal position for excluding said resistance unit from said variable arm; means controlled by said point detector contact in its reverse position for including said resistance unit in said variable arm; means controlled by said point detector contact in its unlocked position for including only a portion of said resistance unit in said variable arm; means responsive to said exclusion and inclusion of the resistance unit in said variable arm for characteristically operating said indication relay to register three distinctive positions of said point detector contact; and a checking relay energized over said variable arm for indicating the continuity of said variable arm.

8. In combination; a railway track switch controlling a point detector contact having normal and reverse positions; a lever having normal and reverse positions; a fixed load resistance; a variable load resistance included in a circuit connected to said lever and said point detector contact; an indication relay having one winding connected across said fixed resistance and another winding connected across said variable resistance; means including a source of current for energizing said circuit; means responsive to the operation of said lever to its normal and reverse positions for actuating said switch to corresponding positions; means controlled by said point detector contact in its normal position for including said variable resistance in said circuit; means controlled by said point detector contact in its reverse position for excluding said variable resistance from said circuit; and means responsive to said inclusion and exclusion of said variable resistance for characteristically operating said indication relay to register two distinctive positions of said point detector contact.

9. In combination; a railway track switch controlling a point detector contact having normal, reverse and unlocked positions; a lever having normal and reverse positions; a fixed load resistance; a variable load resistance included in a circuit connected to said lever and said point detector contact; an indication relay having one winding connected across said fixed resistance and another winding connected across said variable resistance; means including a source of current for energizing said circuit; means responsive to the operation of said lever to its normal and reverse positions for actuating said switch to corresponding positions; means controlled by said point detector contact in its normal position for including said variable resistance in said circuit; means controlled by said point detector contact in its reverse position for excluding said variable resistance from said circuit; means controlled by said point detector contact in its unlocked position for including only a portion of said variable resistance in said circuit; and means responsive to said inclusion and exclusion of said variable resistance for characteristically operating said indication relay to register three distinctive positions of said point detector contact.

10. In combination; a railway track switch controlling a point detector contact having normal and reverse positions; a lever having normal and reverse positions; a fixed load resistance; a variable load resistance included in a circuit connected to said lever and said point detector contact; an indication relay having one winding connected across said fixed resistance and another winding connected across said variable resistance; means including a source of current for energizing said circuit; means responsive to the operation of said lever to its normal and reverse positions for actuating said switch to corresponding positions; means controlled by said point detector contact in its normal position for including said variable resistance in said circuit; means controlled by said point detector contact in its reverse position for excluding said variable resistance from said circuit; means responsive to said inclusion and exclusion of said variable resistance for characteristically operating said indication relay to register two distinctive positions of said point detector contact, and a checking relay energized over said circuit for indicating the continuity of said circuit.

11. In combination; a railway track switch controlling a point detector contact having normal and reverse positions; a lever having normal and reverse positions; a fixed load resistance; a variable load resistance included in a circuit connected to said lever and said point detector contact; an indication relay having one winding connected across said fixed resistance and another winding connected across said variable resistance; means including a source of current for energizing said circuit; means responsive to the operation of said lever to its normal and reverse positions for actuating said switch to corresponding positions; means controlled by said point detector contact in its normal position for including said variable resistance in said circuit; means controlled by said point detector contact in its reverse position for excluding said variable resistance from said circuit; means responsive to said inclusion and exclusion of said variable resistance for characteristically operating said indication relay to register two distinctive positions of said point detector contact, a checking relay energized over said circuit for indicating the continuity of said circuit, and means including said lever and said indication relay for indicating the lack of correspondence between said switch and said lever.

12. In combination; a railway track switch controlling a point detector contact having normal and reverse positions; a lever having normal and reverse positions; a fixed load resistance; a variable load resistance included in a circuit connected to said lever and said point detector contact; an indication relay having one winding connected across said fixed resistance and another winding connected across said variable resistance; means including a source of current for energizing said circuit; means responsive to the operation of said lever to its normal and reverse positions for actuating said switch to corresponding positions; means controlled by said point detector contact in its normal position for including said variable resistance in said circuit; means controlled by said point detector contact in its reverse position for excluding said variable resistance from said circuit; means responsive to said inclusion and exclusion of said variable resistance for characteristically operating said indication relay to register two distinctive positions of said point detector contact; a checking relay energized over said circuit for indicating the continuity of said circuit; means including said lever and said indication relay for indicating the lack of correspondence between said switch and said lever; and means including said indication relay for indicating the unlocked condition of said switch.

13. In combination, a railroad track switch having at least three positions, a central tower, a pair of line wires extending from said switch to said tower, a control relay connected to said line wires at said switch, a control lever and an indicating relay in said tower both serially included in said line wires, means at said tower for energizing said control relay over said line wires in accordance with the position of said lever, and means at said switch for distinctively controlling the energization of said indicating relay over said line wires in accordance with the distinctive positions of said switch simultaneously with the energization of the line wires in accordance with the position of the lever.

14. In combination, a railroad track switch having normal, reverse and midstroke positions, a central tower, a pair of line wires extending from said switch to said tower, a control relay connected to said line wires at said switch, a control lever, a battery and an indicating relay in said tower all serially included in said line wires, means at said tower and including said battery for energizing said control relay over said line wires in accordance with the position of said lever, and means at said switch and including said battery for distinctively energizing said indicating relay over said line wires in accordance with the distinctive positions of said switch.

15. In a remote control system; a control office; a field station; a line circuit connecting said office with said station; a control lever in said office; an electro-responsive device at said station; means responsive to the operation of said lever for characteristically energizing said line circuit with currents of different polarity; means responsive to said characteristic energization of the line circuit for operating said device to different positions; an indication relay connected to said line circuit; means controlled by said device for varying the degree of energization of said line circuit from a normal value to an abnormal value; means controlled by said device for varying the degree of energization of said line circuit from a normal value to a sub-normal value; and means responsive to the normal, abnormal and sub-normal values of line circuit energization for registering on said relay three distinctive conditions of said device.

16. In a remote control system; a control office; a field station; a line circuit connecting said office with said station; a control lever in said office; an electro-responsive device at said station; means responsive to the operation of said lever for characteristically energizing said line circuit with currents of different polarity; means responsive to said characteristic energization of the line circuit for operating said device to different positions; an indication relay connected to said line circuit; means controlled by said device for varying the degree of energization of said line circuit from a normal value to an abnormal value; means controlled by said device for varying the degree of energization of said line circuit from a normal value to a sub-normal value; means responsive to the normal, abnormal and sub-normal values of line circuit energization for registering on said relay three distinctive conditions of said device; and means responsive to an open circuit condition of said line circuit for registering this condition in said office.

17. In combination; a polar control relay for controlling the position of a railway traffic governing device; a polar indication relay for indicating the position of said device; a checking relay; a normal control circuit including a pair of line wires, said control, said indication and said checking relays in series; a reverse control circuit including said pair of line wires, said control, said indication and said checking relays in series; indication means controlled by said indication relay; and means controlled by said checking relay for at times preventing the control of said indication means by said indication relay in the event of an interruption in the continuity of said pair of line wires.

18. In combination; a polar control relay for controlling the position of a railway traffic governing device; a polar indication relay for indicating the position of said device; a normal control circuit and a reverse control circuit each including said relays in series in such a manner that the energization of said normal circuit and said reverse circuit actuates a polar contact of said control relay to normal and reverse positions respectively, while the polarity of the energization of said normal circuit and said reverse circuit fails to distinctively actuate the polar contact of said indication relay; and means for conditioning said circuits for actuating the polar contact of said indication relay to its normal or reverse position in accordance with the normal or reverse condition of said traffic governing device.

19. In combination, a railway traffic governing device, a pair of line wires, means for continuously energizing said line wires with current of normal or reverse polarity from a single source for controlling the operation of said governing device, an indication means, means controlled by said governing device for controlling the degree of current with which said line wires are energized from said source for causing said indication means to display a constant indication of the position of said device, and checking means for causing said indication means to indicate the condition that said line wires are deenergized said last mentioned condition being a fault condition.

20. In combination; a railway traffic governing device having three different positions; a pair of line wires; means for continuously energizing said line wires with current of distinctive character for controlling the distinctive operation of said governing device; an indication means connected to said line wires; and means controlled by said governing device when moved to its different positions to cause changes in the degree of said energization of said line wires and the direction of energization of said indication means, whereby said indication means is distinctively operated to display any one of three conditions of said governing device.

WINFRED T. POWELL.